US006970346B2

(12) United States Patent
Shih

(10) Patent No.: US 6,970,346 B2
(45) Date of Patent: Nov. 29, 2005

(54) REDUNDANT POWER SUPPLY WIRELESSLY CONNECTED TO MOTHERBOARD

(75) Inventor: Shoei-Yuan Shih, Shijr (TW)

(73) Assignee: Evserv Tech Corporation, Taipei Hsien (TW)

(*) Notice: Subject to any disclaimer, the term of this patent is extended or adjusted under 35 U.S.C. 154(b) by 160 days.

(21) Appl. No.: 10/623,647

(22) Filed: Jul. 22, 2003

(65) Prior Publication Data
US 2005/0018388 A1 Jan. 27, 2005

(51) Int. Cl.[7] ............................................. H05K 5/00
(52) U.S. Cl. ........................................ 361/679; 361/683
(58) Field of Search ............................ 361/679, 683, 361/686–687

(56) References Cited

U.S. PATENT DOCUMENTS 6,377,471 B1 * 4/2002 Chong et al. ................ 361/796
6,785,133 B2 * 8/2004 Barringer et al. ........... 361/694

* cited by examiner

Primary Examiner—Yean-Hsi Chang
(74) Attorney, Agent, or Firm—Birch, Stewart, Kolasch & Birch, LLP

(57) ABSTRACT

A redundant power supply is wirelessly connected to at least two power supplies and a motherboard for main computation and control by means of a card insertion mode. Through a first component disposed on the rear panel of the power supply for electrically connecting each power supply, a second component disposed on the rear panel of the power supply, and a third component for electrically connecting to the second component with the connection specification compatible with the second component, a redundant power supply that does not require any wire material for the connection is constituted.

11 Claims, 8 Drawing Sheets

REDUNDANT POWER SUPPLY WIRELESSLY CONNECTED TO MOTHERBOARD

FIELD OF THE INVENTION

The present invention relates to a redundant power supply that is wirelessly connected to a motherboard, more particularly to a redundant power supply that is used in a computer system such as a server, a disk array, or a desktop personal computer.

BACKGROUND OF THE INVENTION

To cope with the blooming information industry, various electronic products tend to introduce all kinds of integrated computer devices with different configurations to meet user's requirements. Since the general desktop computer, notebook computer, or standalone server has saturated data storage capacity and lacks expandability, the integrated design of external storage devices (such as redundant array of independent disk drives) becomes a key point for the research and development of the information industry.

Please refer to FIG. 1 for an illustrative diagram of the present external storage device, which has an integrated structure comprising several basic electronic modules such as an information storage unit, a power supply unit a logic and arithmetic unit, a heat dissipating unit, and a bus connecting unit. Compared with the general single storage device (such as a removable hard disk rack), the main point of consideration for the integration relies on the external storage device having an external power supply for the power and its application, and also having a heat dissipating unit to keep the internal storage device at a specific temperature and maintain the operating performance. However, the assembling of this kind of device still remains unchanged from the electric connection mode of a general computer system. Besides using a detachable connection mode to accomplish the convenience of a wireless connection, the data storage unit still needs a power cable or a bus cable for the connection between the arithmetic logic unit, the heat dissipating unit, and the bus connecting unit. First of all, such assembly not only involves long working hours and complicated manufacturing process, but also makes the maintenance or repair very difficult when the system or any component fails. The whole casing of the main system has to be removed first before the cable can be removed for maintenance and repair, and thus it is difficult to accomplish the hot-plug function.

Furthermore, since the cable is too long, a certain space must be reserved for accommodating the remaining cable when designing the computer casing. As a result, the overall volume of the device cannot be minimized to a size convenient for disposition or transportation, and definitely cannot comply with the trend of a compact product design. In addition, the isolation of the remaining cable will cause a poor performance on extracting the hot air produced by the interior heat generating units and directly affecting the operation and performance of the external storage device.

SUMMARY OF THE INVENTION

The primary objective of the present invention is to solve the aforementioned problems and eliminate the drawbacks of cited prior art. The present invention makes use of a card insertion mode to wirelessly connect at least two power supplies and a motherboard for the main computation and control Through a first component disposed on the rear panel of the power supply for electrically connecting each power supply, a second component disposed on the rear panel of the power supply, and a third component for electrically connecting to the second component with the connection specification compatible with the second component, a redundant power supply that does not require any wire material for the installation is constituted.

DETAILED DESCRIPTION OF THE PREFERRED EMBODIMENTS

Figure 1:
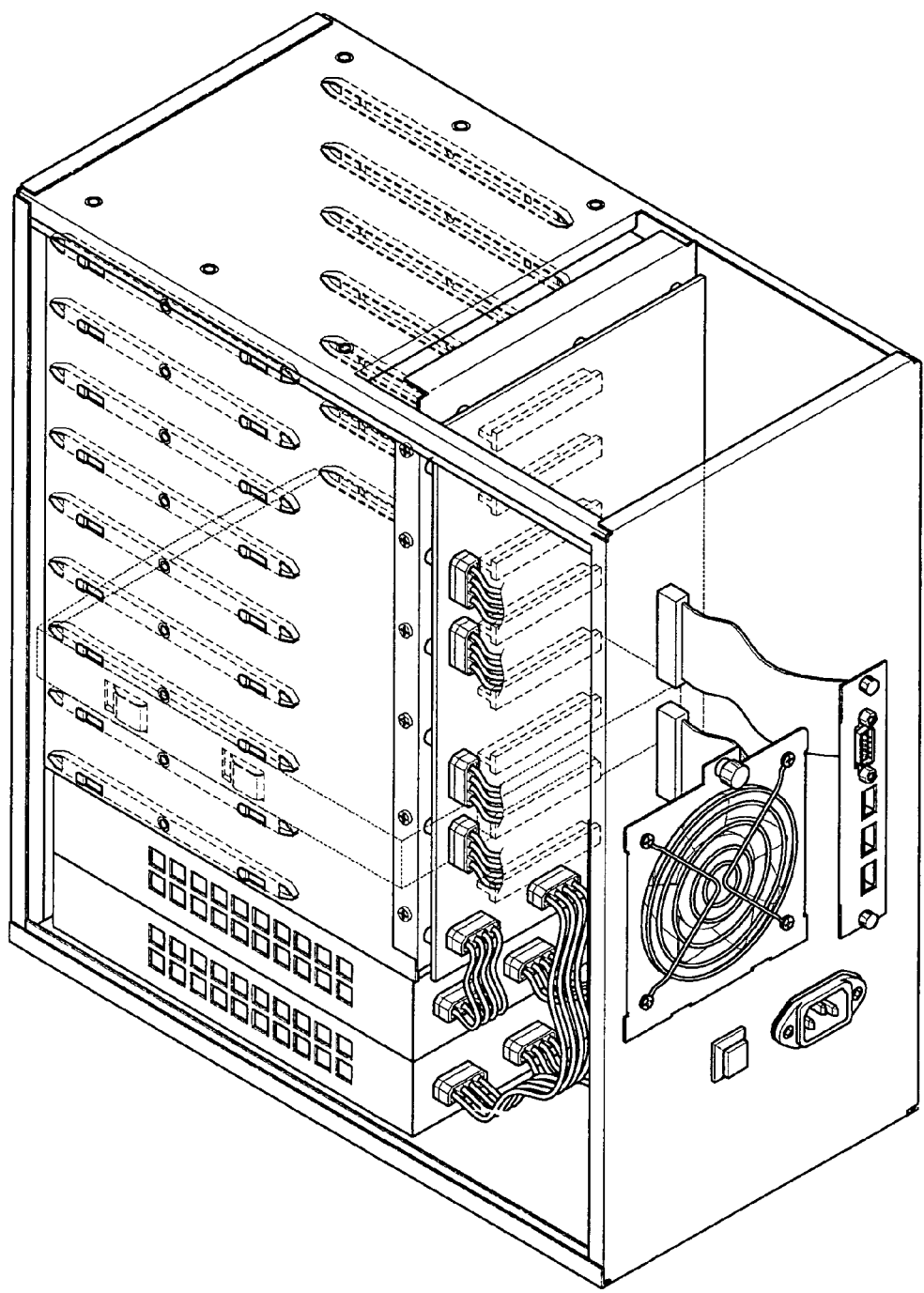
FIG. 1 is a perspective diagram of a prior art.
Figure 2:
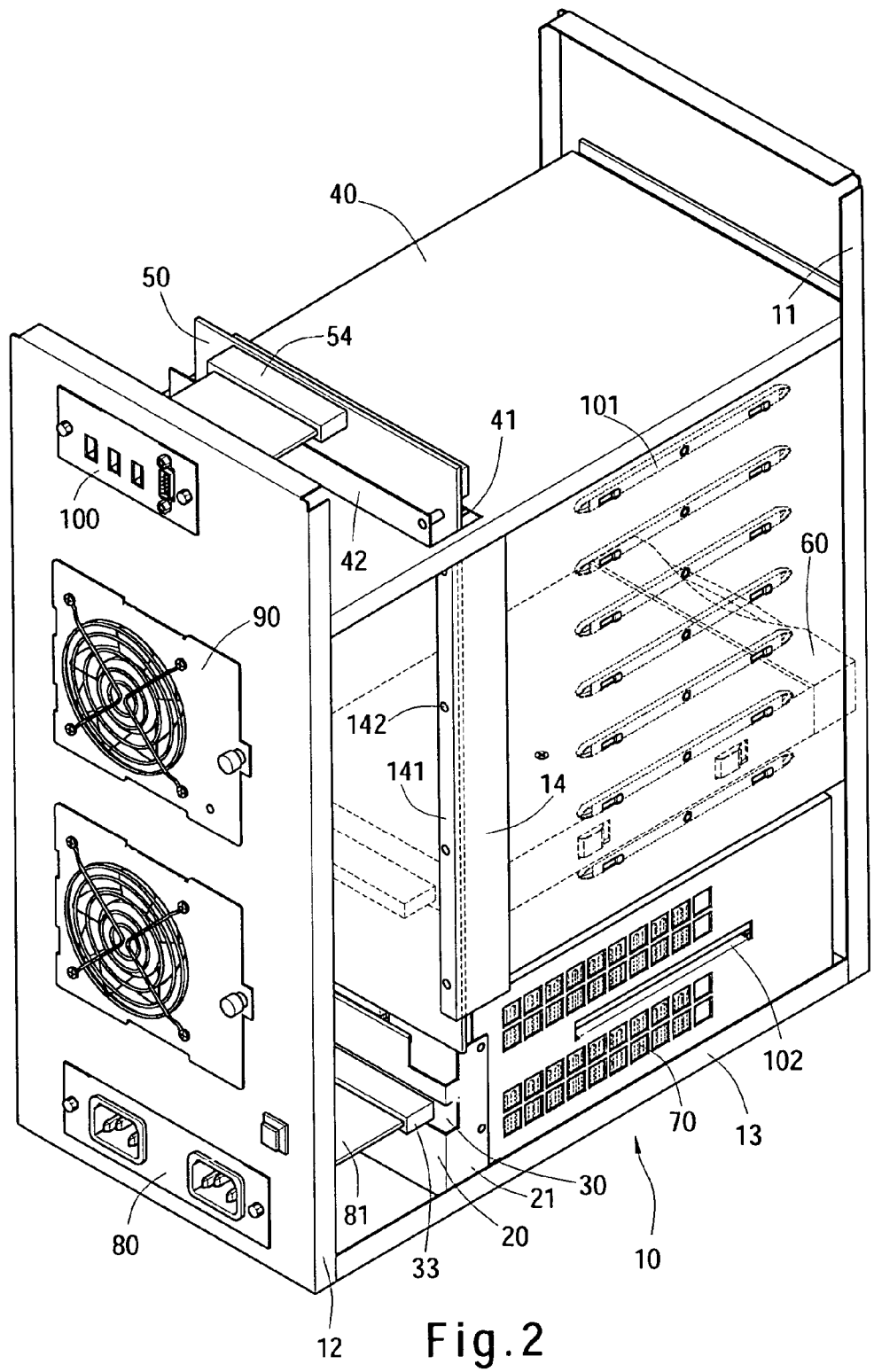
FIG. 2 is a perspective diagram of the present invention.
Figure 3A:
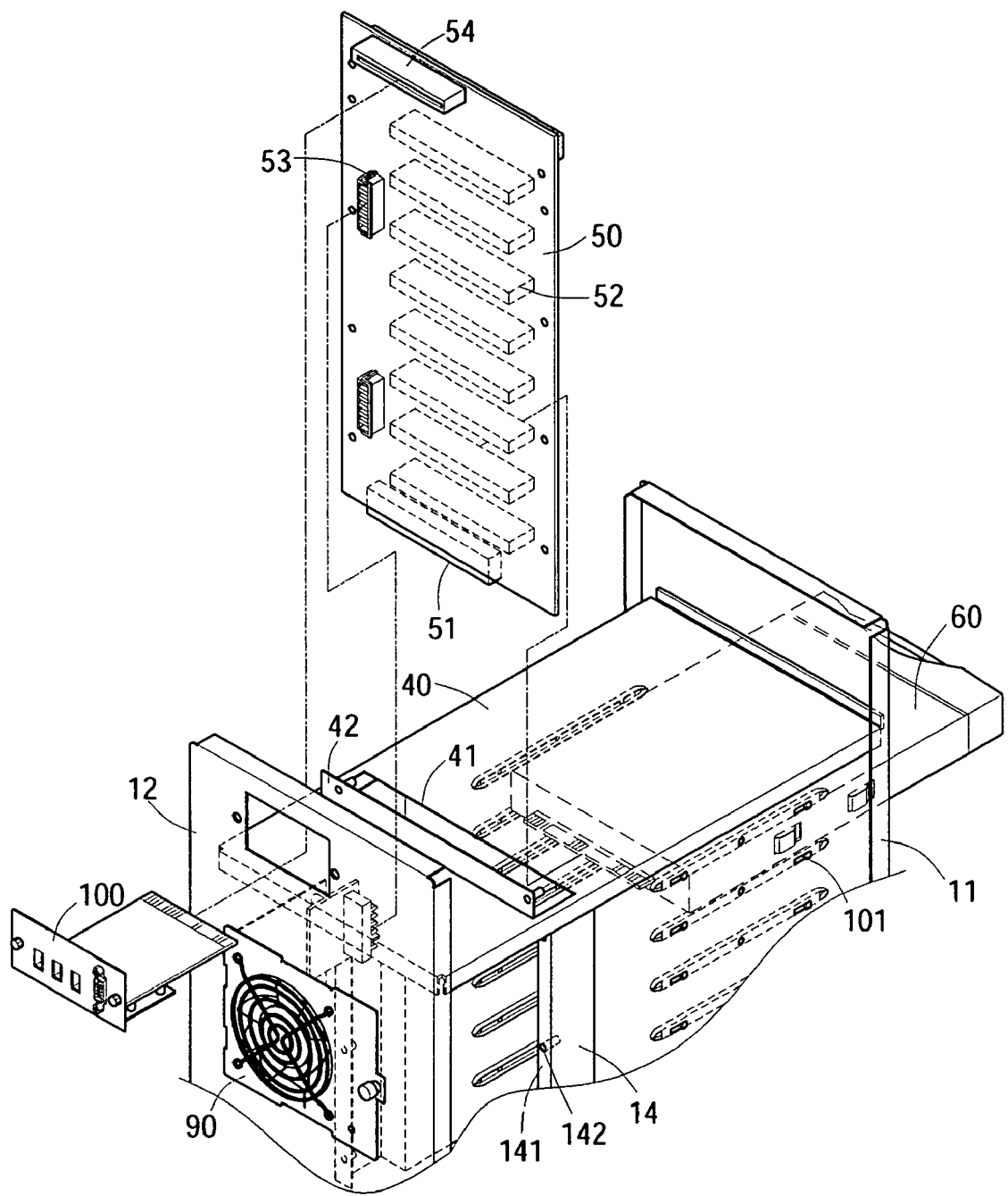
FIGS. 3A~3C are illustrative diagrams of the disassembled parts of the structure according to the present invention.
Figure 3B:
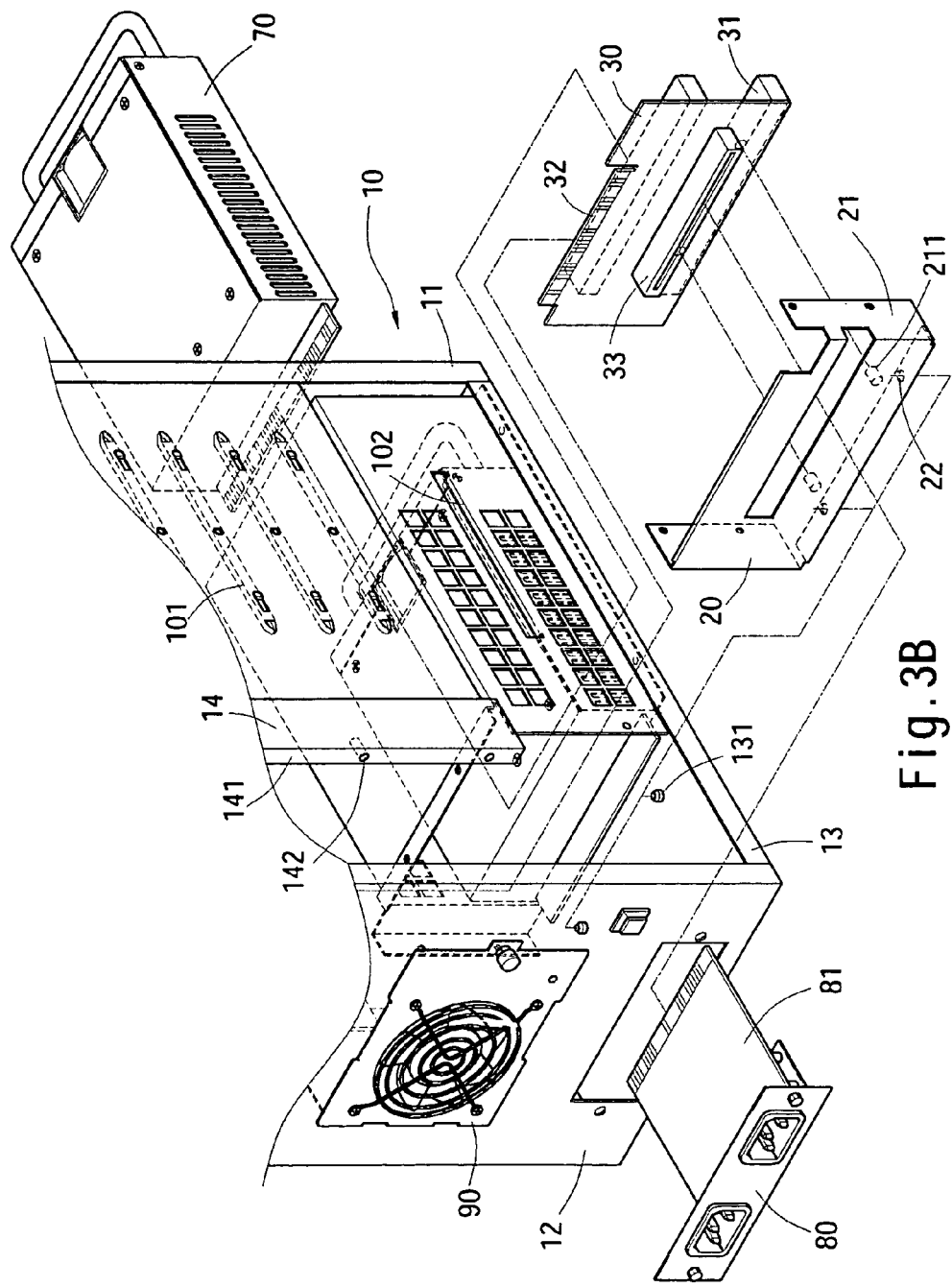
Figure 3C:
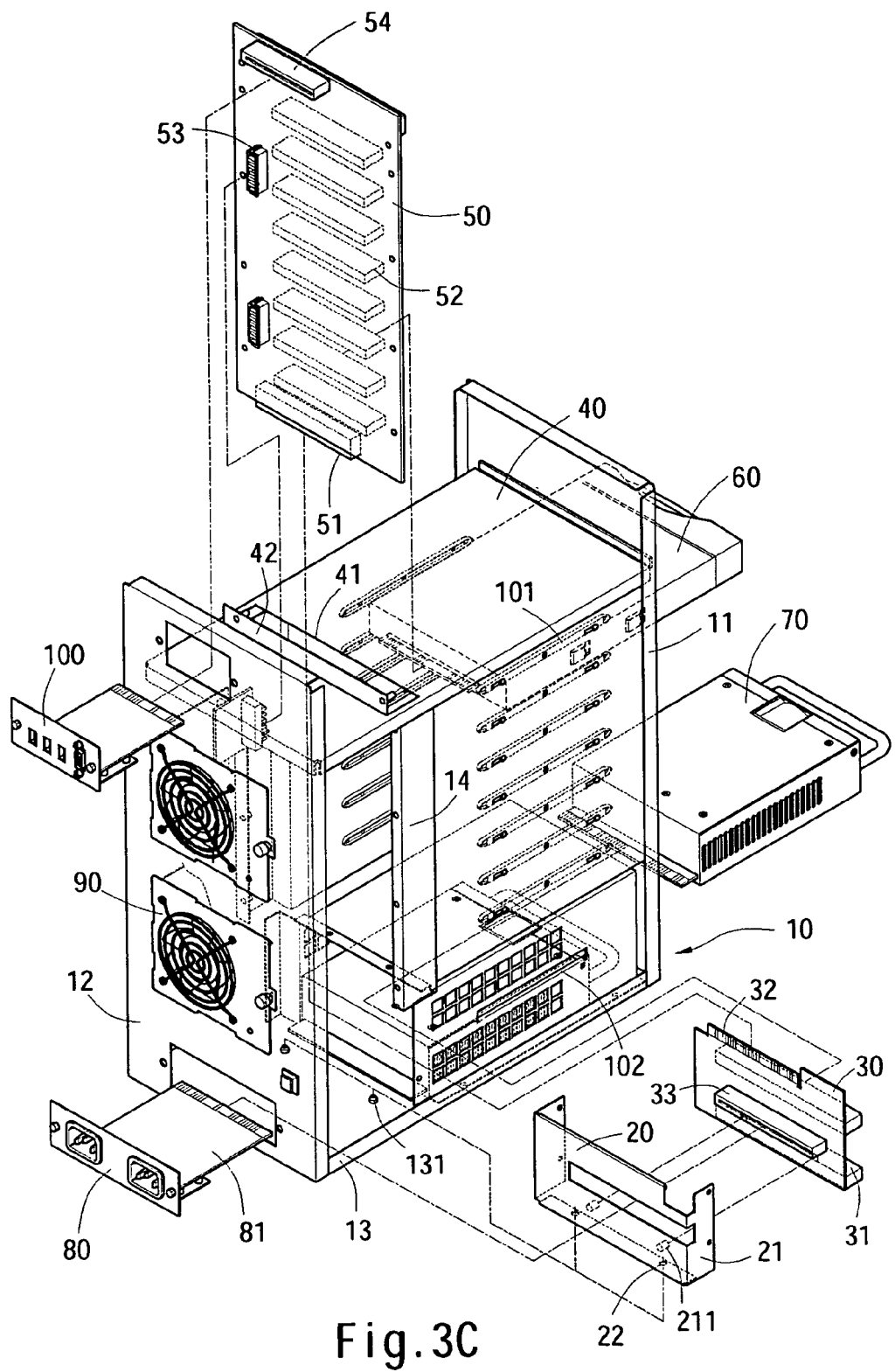
Figure 4:
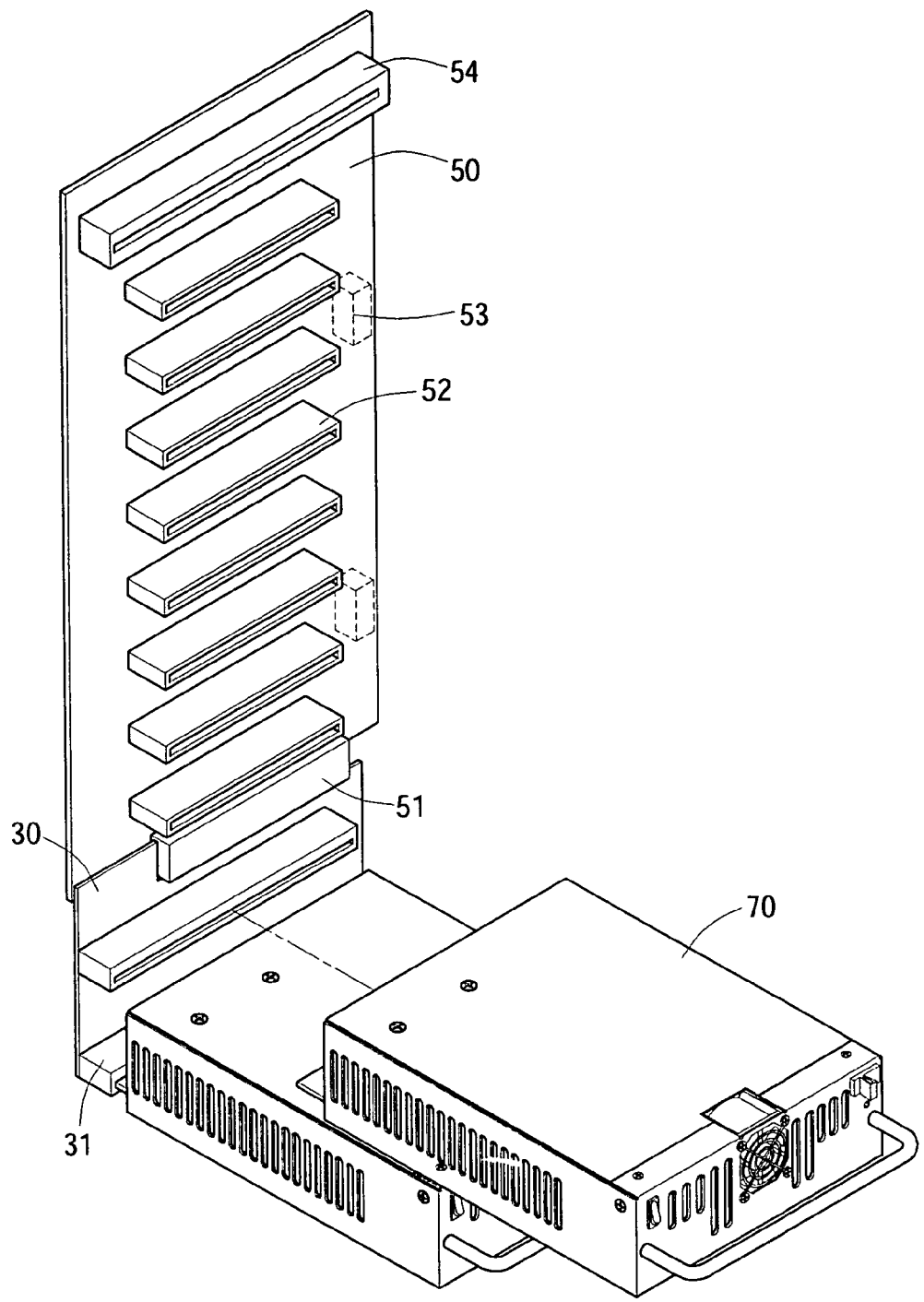
FIG. 4 is an illustrative diagram of assembling the rear panel, motherboard, and power supply according to the present invention.
Figure 5:
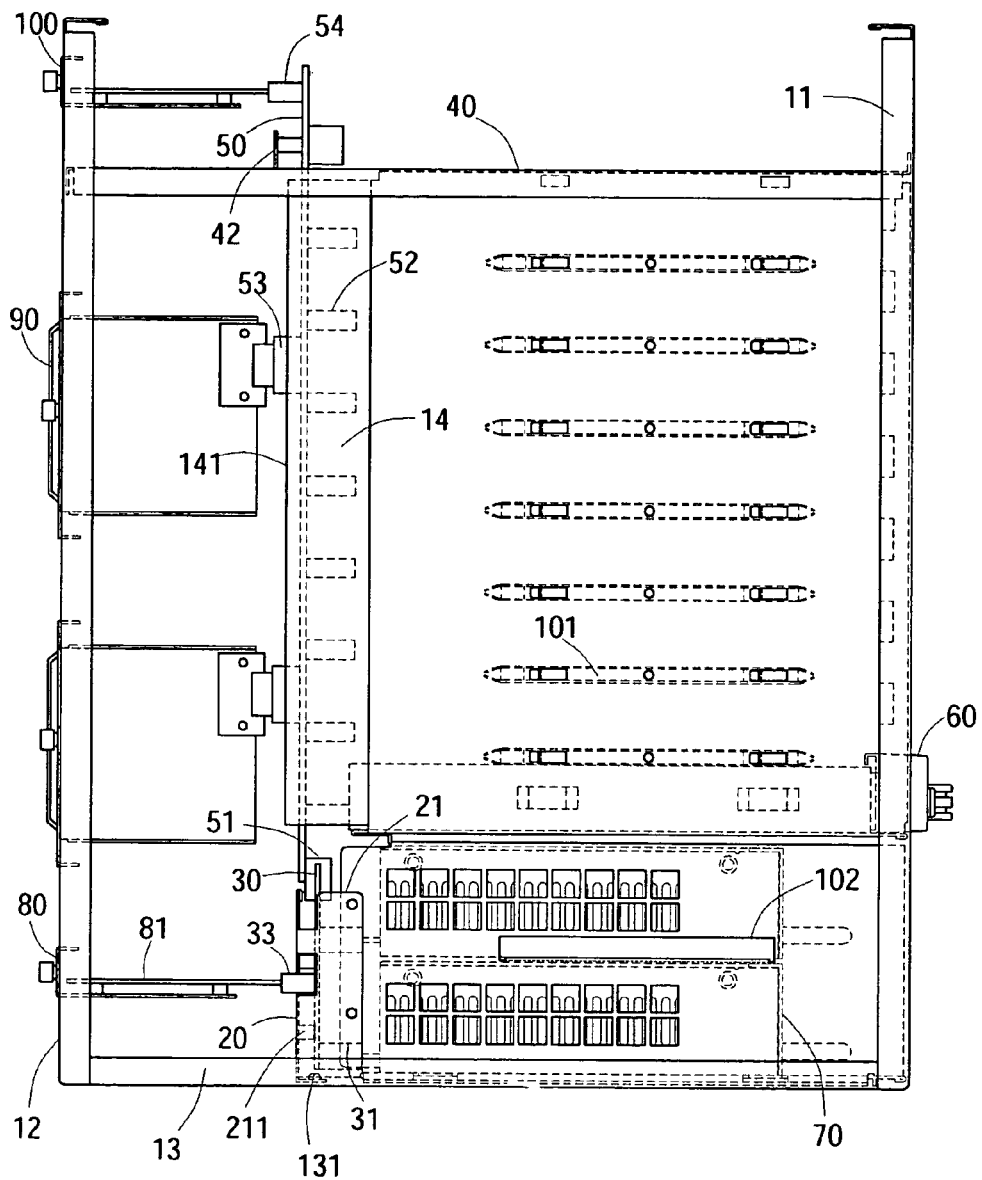
FIG. 5 is a side-view diagram of the assembled structure of the present invention.

Please refer to FIGS. 2, 3A~3C, 4, and 5 for the present invention. In the figures, the present invention makes use of a card insertion mode to wirelessly connect at least two power supplies 70 and a motherboard 50 for the main control and computation. Such arrangement reduces the use of traditional cables for the connection, and allows components such as the motherboard 50, rear panel 30, and the power supply 70 to have better heat dissipation space and convenient assembling, in which the casing for accommodating the redundant power supply 70 comprises:

a main rack 10 including a front panel 11, a rear panel 12, and a bottom panel 13, and said main rack 10 using two side panels 14 to define an upper space and a lower space, and a track 101, 102 being used to define a plurality of accessing spaces for accommodating a plurality of data storage units 60 and the power supplies 70, and a fixing plate 141 having a fixing pillar 142 being bent from the inner edge of the two side panels 14;

a secondary rack 20, having two side edges corresponding to two side panels 14 coupled to a fixing plate 21 extended and bent from the lower space, and comprising a fixing pillar 211 to couple to a rear panel 30 at the rear of the power supply 70, a fixing hole 22 disposed on the secondary rack 20, and a protruded fixing pillar 131 disposed on the bottom panel 13 at a position corresponding to the fixing hole 22;

an upper partition 40, installed above the two side panels 14, and comprising an insert opening 41 disposed on the upper partition 40 at the position of the fixing plate 141 of the two side panels 14 such that a motherboard 50 being inserted from the insert opening 41 into the rear panel 30 and mounted on the fixing pillar 142 of the fixing plate 141.

Through a first component 31 disposed on the rear panel 30 for electrically connecting each power supply 70, a second component 32 disposed on the rear panel 30, and a third component 51 disposed on the motherboard 50 for electrically connecting to the second component 32 with the connection specification compatible with the second component 32, a casing for the redundant power supply 70 that does not require any wire material for the connection is constituted.

When each component is assembled, the fixing hole 22 of the secondary rack 20 aligns precisely to the protruded fixing pillar 131 on the bottom panel 13, and let the secondary rack 20 lean against the two side panels 14, and then pass a fixture (not shown in the figure) through the fixing hole on two connecting plates 21 such that the secondary rack 20 is mounted at the lower backside of the two side panels. At that time, inert the motherboard 50 from the insert opening 41 of the upper partition 40 and pass it through the third component 51 to define a gold finger mode, and the third component 51 on the motherboard 50 is in the connecting port and slot mode. Therefore, when the motherboard is inserted, the motherboard will be electrically connected to the second component 31 and the third component 51. The fixture is used to pass through the fixing pillar 142 on the fixing plate 141 in order to fix the motherboard 50. If the height of the motherboard 50 exceeds the upper partition 40, then the upper partition 40 at the position of the insert opening 41 can be bent to form a connecting plate 42. Similarly, a fixture is passed through the upper section of the motherboard 50 so that the motherboard 50 can be secured inside the casing.

After the motherboard 50 and the rear panel 30 are installed, users can detach a data storage unit 60 (such as a hard disk) from a track 101 at the space of a fifth component 52 on the motherboard 50 or assemble it to form an electric connection. Two or more power supplies 70 can be inserted into the rear panel 30 through the track 102 at the lower space to obtain the connecting port and slot mode similar to that of the first component 31. Such arrangement constitutes an electric connection and a redundant power supply 70.

It is noteworthy that the power supply 70 is vertically and electrically connected to the rear panel to fit the size of the motherboard 50 and the user's accessing habit; and the motherboard is horizontally and electrically connected to the rear panel 30.

Further, the rear panel 30 adds a fourth component 33 for connecting a compatible circuit board 81, and such circuit board 81 has more than one power connector being connected to the external power supply. The motherboard 50 further comprises a sixth component 53 for connecting to the heat dissipating fan 90 and a seventh component 54 for connecting to a bus module 100 with a main purpose of connecting each electronic module without using additional wire materials, and enhance the practicability of this invention.

Figure 6:
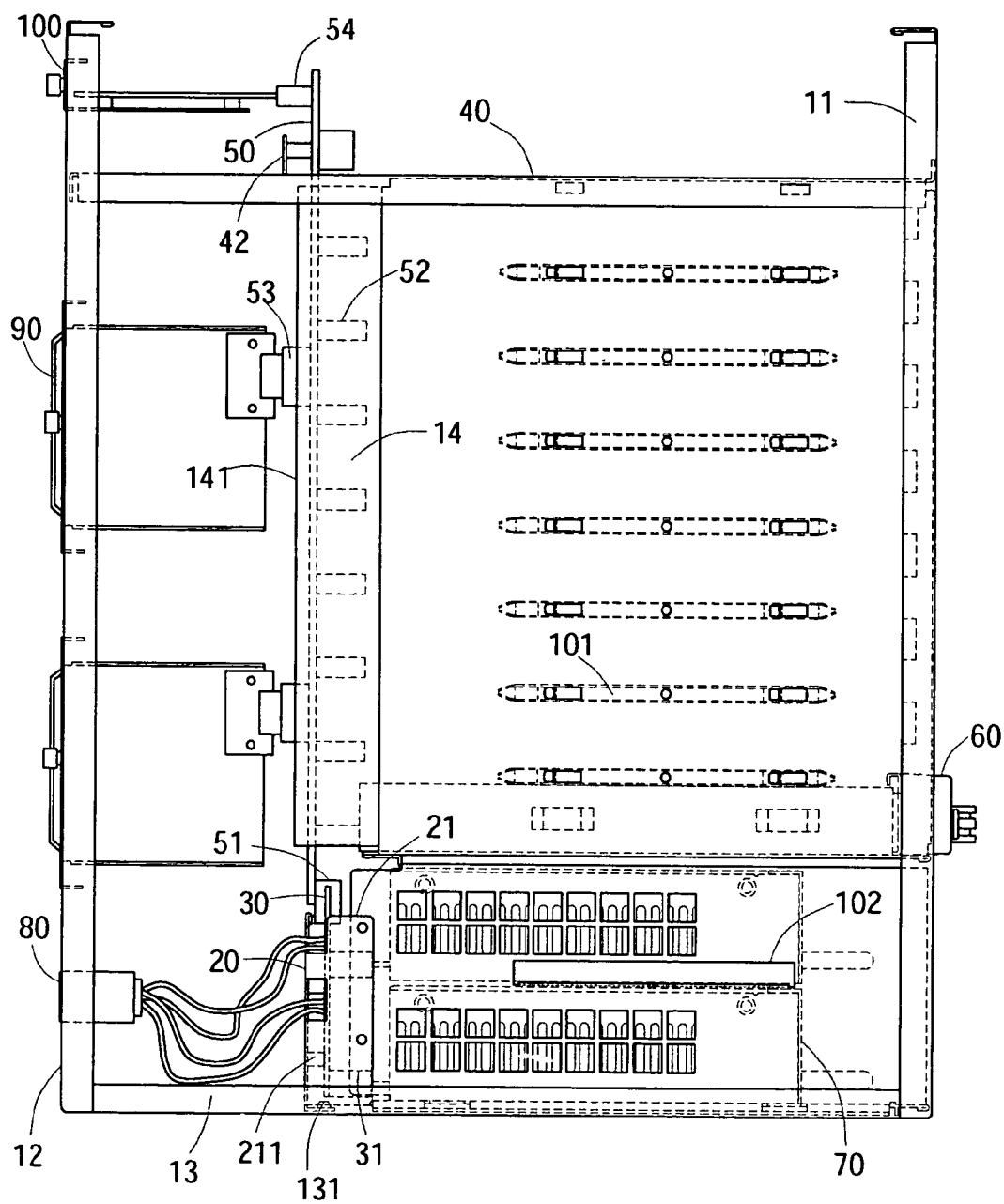
FIG. 6 is an illustrative diagram of another preferred embodiment of the present invention.

At present, there are not too many power connectors 80 adopting wireless connection in the market, and the main reason relies on the external power supply and power connector 80 are usually disposed at the lower part of the casing, which has less impact on the upper heat dissipating fan 90. Therefore, this invention can use cables to connect the power connector 80 as shown in FIG. 6, and the connection of the rest of the electronic modules are wireless.

In summation of the above description, this invention adopts the card insertion mode to wirelessly connect at least tow or more power supplies 70 and a motherboard 50 for the main computation and control, not only saving the extra cables for installing the redundant power supply 70, but also wastes no installation time. This invention does not leave any remaining cable, and thus the heat dissipating fan 90 can make the convection of air and the dissipation of heat smoother inside the casing, not mentioning the convenience of assembling and maintaining computers.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A redundant power supply cable-lessly connected to a motherboard, using a card insertion mode to cable-lessly connect at least two power supplies and a motherboard having a connection component, comprising:

a rear panel disposed at a rear side of a power supply, the rear panel including a first component and a second component, the first component facing the rear side of the power supply, the power supply being inserted into the first component in a first direction, the second component facing the connection component of the motherboard, the second component being received by the connection component of the motherboard in a second direction perpendicular to the first direction, thereby forming cable-less connection between the redundant power supply and the motherboard.

2. The redundant power supply cable-lessly connected to motherboard of claim 1, wherein said first component is in a port and slot mode.

3. The redundant power supply cable-lessly connected to motherboard of claim 1, wherein said second component is in a gold finger mode.

4. The redundant power supply cable-lessly connected to motherboard of claim 1, wherein said connection component is in a port and slot mode.

5. The redundant power supply cable-lessly connected to motherboard of claim 1, wherein said rear panel further comprises a third component connected to a circuit board, the circuit board having one or more power jacks for receiving an external power supply.

6. The redundant power supply cable-lessly connected to motherboard of claim 1, wherein the first direction is a direction parallel to a normal of the rear panel.

7. The redundant power supply cable-lessly connected to motherboard of claim 1, wherein the second direction is a direction perpendicular to a normal of the rear panel.

8. The redundant power supply cable-lessly connected to motherboard of claim 1, further comprising a casing, said casing for accommodating said redundant power supply comprising:

a main rack, the main rack including a front panel, a back panel, a bottom panel, two side panels defining an upper space and a lower space, a plurality of accessing spaces being defined by tracks in said upper space and lower space for accommodating a plurality of data storage units and power supplies, and a first fixing plate having a first fixing pillar being bent from the inner edge of the two side panels;

a secondary rack, having a second fixing plate coupled to the two sides panels and being bent and extended from said lower space, and a second fixing pillar for coupling to the rear panel with the power supply; and an upper partition, installed above said two side panels, an insert opening being disposed on said upper partition at a position of said first fixing plate, such that the motherboard being inserted from the insert opening to receive the second component of said rear panel and being mounted on said second fixing pillar of said second fixing plate.

9. The redundant power supply cable-lessly connected to motherboard of claim 8, wherein said secondary rack comprises a fixing hole and a protruded fixing pillar disposed on said bottom panel corresponding to the position of said fixing hole.

10. The redundant power supply cable-lessly connected to motherboard of claim 8, wherein the secondary rack has an opening and the rear panel further comprises a third component, a circuit board being inserted through the opening of the secondary rack and being received by the third component of the rear panel, the circuit board having one or more power jacks for receiving an external power supply.

11. A redundant power supply cable-lessly connected to a motherboard, using a card insertion mode to cable-lessly connect at least two power supplies and a motherboard having a connection component, comprising:

a rear panel disposed at a rear side of a power supply, the rear panel including a first component and a second component, the first component facing the rear side of the power supply, the power supply being inserted into the first component in a first direction parallel to a normal of the rear panel, the second component facing the connection component of the motherboard, the second component being received by the connection component of the motherboard in a second direction perpendicular to the first direction and perpendicular to a normal of the rear panel, thereby forming cable-less connection between the redundant power supply and the motherboard.

* * * * *